United States Patent
Renotte et al.

(10) Patent No.: US 11,677,229 B2
(45) Date of Patent: Jun. 13, 2023

(54) OVERVOLTAGE PROTECTION FOR A VARIABLE-SPEED AND CONSTANT-FREQUENCY ELECTRICAL ENERGY GENERATION SYSTEM

(71) Applicant: SAFRAN ELECTRICAL & POWER, Blagnac (FR)

(72) Inventors: Alexis Renotte, Moissy-Cramayel (FR); Benoit Michaud, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 127 days.

(21) Appl. No.: 17/418,351

(22) PCT Filed: Dec. 19, 2019

(86) PCT No.: PCT/FR2019/053202
§ 371 (c)(1),
(2) Date: Jun. 25, 2021

(87) PCT Pub. No.: WO2020/136333
PCT Pub. Date: Jul. 2, 2020

(65) Prior Publication Data
US 2022/0069565 A1    Mar. 3, 2022

(30) Foreign Application Priority Data

Dec. 28, 2018 (FR) ..................................... 1874380

(51) Int. Cl.
*H02H 7/06* (2006.01)
*H02H 9/04* (2006.01)
(Continued)

(52) U.S. Cl.
CPC .............. *H02H 7/06* (2013.01); *H02H 9/041* (2013.01); *H02P 27/06* (2013.01); *H02P 9/102* (2013.01)

(58) Field of Classification Search
CPC .......... H02P 27/00; H02P 27/04; H02P 27/06; H02P 27/08; H02P 27/085; H02P 9/00;
(Continued)

(56) References Cited

U.S. PATENT DOCUMENTS

| 6,577,483 B1 | 6/2003 | Streicher et al. |
| 2013/0077201 A1 | 3/2013 | Sagona |

FOREIGN PATENT DOCUMENTS

| WO | 9217930 A1 | 10/1992 | |
| WO | WO-9217930 A1 * | 10/1992 | ....... G02F 1/133753 |

OTHER PUBLICATIONS

Search Report issued in French Patent Application No. 1874380 dated Oct. 25, 2019.
(Continued)

*Primary Examiner* — Antony M Paul
(74) *Attorney, Agent, or Firm* — Pearne & Gordon LLP (57) ABSTRACT

Overvoltage protection device for a variable-speed and constant-frequency electrical energy generation system includes at least one DC current generator connected, via a DC current bus to the input terminals of at least one inverter and to at least one regulation module for regulating the output voltage of the at least one inverter. The device includes a circuit including at least one switch in series with a resistor, the circuit being connected between the input terminals of the at least one inverter, at least one measurement sensor for measuring the DC voltage across the input terminals of the at least one inverter, a control circuit connected to the at least one measurement sensor and able to receive a voltage measured by the at least one measure- (Continued)

ment sensor, compare the measured voltage against a threshold and command the closure of the at least one switch if the measured voltage is greater than the threshold, and command opening thereof if not.

7 Claims, 6 Drawing Sheets

(51) Int. Cl.
  *H02P 27/06* (2006.01)
  *H02P 9/10* (2006.01)
(58) Field of Classification Search
  CPC .. H02P 9/102; H02P 9/006; H02P 9/48; H02P 29/02; H02P 29/032; H02P 29/0241; H02P 29/027
  See application file for complete search history.

(56) References Cited

OTHER PUBLICATIONS

International Search Report for issued in Application No. PCT/FR2019/053202 dated May 18, 2020.
Written Opinion for PCT/FR2019/053202 dated May 18, 2020.

\* cited by examiner

OVERVOLTAGE PROTECTION FOR A VARIABLE-SPEED AND CONSTANT-FREQUENCY ELECTRICAL ENERGY GENERATION SYSTEM

This is the National Stage of PCT international application PCT/FR2019/053202, filed on Dec. 19, 2019 entitled "OVERVOLTAGE PROTECTION FOR A VARIABLE-SPEED AND CONSTANT-FREQUENCY ELECTRICAL ENERGY GENERATION SYSTEM", which claims the priority of French Patent Application No. 1874380 filed Dec. 28, 2018, both of which are incorporated herein by reference in their entirety.

TECHNICAL FIELD

This invention relates in general to electricity generation systems used in aircraft. In particular, it relates to a variable speed constant frequency system, known as a VSCF system: "Variable Speed Constant Frequency".

PRIOR ART

The use of an electricity generator to power aircraft equipment is known in the aeronautical field. Equipment must be provided to prevent overvoltages from occurring.

Thus, a first electrical energy generation system comprises a generator connected to a power distribution centre that supplies power to aircraft loads. In the event of an overvoltage, a circuit called a "crowbar" circuit can be used to short circuit power lines between the generator and the distribution centre. These power lines are then connected to the neutral of the aircraft electricity network to cause the voltage to drop. A line contactor is open and excitation of the generator is interrupted.

Thus, the appearance of an overvoltage causes a service interruption, before the electrical system is restarted.

It should be noted that the crowbar circuit acts just upstream from the power distribution centre, which implies that an electrical fault that occurs is transmitted throughout the power circuit.

In another electrical energy generation application, equipment is provided to quickly demagnetise the generator by cutting off its excitation by discharging the inductance of the generator excitation coil into a resistor. It thus offers a protection solution independent of the generator control system, dissimilar, and dimensioned on relatively low powers compared with powers involved for the previous equipment because it only acts on excitation of the generator and not on the main power of the machine.

However, this solution requires that the protective device be put in series in the machine excitation line. Therefore, this impacts the regulation performances by adding voltage drops to the excitation wiring.

In addition, one type of system for generating electrical energy from the aircraft engine(s) to be sent to the different electrical equipment installed on the aircraft is the Variable Speed Constant Frequency system, known as the VSCF system. This is a power generation system that comprises a generator driven directly by the aircraft engine and a power converter to convert the generator output to a constant frequency power for aircraft loads.

Such a VSCF system conventionally includes a voltage regulation system.

An example of an electrical energy generation system of this type is described in WO 92 17930. It comprises a clipping system to eliminate overvoltages on the DC network, and its regulation.

This clipping system interacts with a voltage regulation system by excitation of the generator. This implies that the clipping system and the voltage regulation system by excitation of the generator are not independent.

In addition, this clipping system is limited to a configuration with a single generator.

The purpose of the invention is to disclose an overvoltage protection device for a variable speed constant frequency (VSCF) system that is independent of the voltage regulation system installed in the VSCF system.

PRESENTATION OF THE INVENTION

The invention is intended to solve problems of prior art by providing a variable speed, constant frequency electrical energy generation system comprising at least one DC generator connected by a DC bus to the input terminals of at least one inverter and at least one regulation module for regulating the output voltage of the at least one inverter, the inverter comprising one or two inverter modules each connected to the input terminals of the inverter, a capacitive mid-point connected to the aircraft neutral being connected to the input terminals of the inverter via two corresponding capacitors, characterised in that it comprises an overvoltage protection device comprising A circuit comprising at least one switch in series with a resistor, the circuit being connected between the input terminals of the at least one inverter, a first voltage sensor to measure the voltage between a first input terminal of the inverter and the capacitive mid-point, a second voltage sensor to measure the voltage between a second input terminal of the inverter and the capacitive mid-point and two switches between the first terminal of the inverter and the capacitive mid-point and between the second terminal of the inverter and the capacitive mid-point, respectively, A control circuit connected to the first and second measurement sensors and capable of receiving a voltage measured by the first and second measurement sensors respectively, comparing the measured voltage with a threshold and controlling closure of at least one switch if the measured voltage is greater than the threshold and otherwise opening of the at least one switch. The overvoltage protection device according to the invention is used to prevent overvoltages at the output of the variable speed and constant frequency (VSCF) electricity generation system, i.e. at aircraft loads that are powered by the VSCF system.

The overvoltage protection device according to the invention is independent of the voltage regulation system fitted to the VSCF system. Regulation can be performed by controlling the generator excitation voltage or by controlling the inverter.

There is thus a clear segmentation between the regulation system and the overvoltage protection device. In addition, the line contactor, the excitation management and the cutoff device for pulse width modulation (PWM) circuits act to provide secondary protection and are dissimilar to the overvoltage protection device.

The overvoltage protection device according to the invention does not require a measurement of the output voltage of the VSCF system.

The overvoltage protection device according to the invention makes it possible to limit the DC voltage within the VSCF system without affecting the generator control. Therefore dynamic control constraints on the regulation system are limited.

The overvoltage protection device according to the invention is compatible with a system architecture comprising several energy sources and/or connected to several electricity distribution networks.

By limiting overvoltages at the output of the inverter, the device according to the invention makes an additional delay possible to compensate for this overvoltage by the voltage regulation system or to initiate a protective action, which limits constraints on the generator and its regulation.

For example, this additional delay makes it possible to use the line contactor as a means of protection, despite its relatively long opening time, for example of the order of 30 ms The device according to the invention enables better service continuity of aircraft loads.

The device according to the invention limits overvoltages upstream from the inverter, which limits the transmission of faults.

For the VSCF system comprising an inverter equipped with a capacitive mid-point, the device according to the invention prevents the appearance of a DC voltage at the output of the inverter in the case of a short circuit of a semiconductor of the inverter, without short circuiting the generator.

According to alternative preferred characteristics, the at least one regulation module for regulating the output voltage of the at least one inverter is adapted to control the at least one inverter or to control the excitation current of the at least one generator.

According to one preferred characteristic, the control circuit is capable of receiving a voltage value measured at the output of the at least one inverter by at least one voltage sensor, and is capable of controlling opening of a line contactor located at the output of the at least one inverter.

According to one preferred characteristic, the control circuit is capable of ordering that operation of the at least one inverter is stopped.

According to one preferred characteristic, the control circuit is capable of ordering that excitation of the at least one generator is stopped.

The invention also relates to a method of protection against overvoltages of a variable speed constant frequency system in the particular embodiment of the invention previously presented, characterised in that it comprises steps to:

Detect a short circuit on an inverter semiconductor connected to one of the inverter input terminals, Order closing of the switch corresponding to said one of the inverter input terminals, Stop control of the inverter, Order opening of the line contactor and cut off the generator excitation current, Order closing of the switch corresponding to the other of the inverter input terminals after a timeout.

The invention also relates to a variable speed constant frequency electrical energy generation system comprising at least one DC generator connected by a DC bus to the input terminals of at least one inverter and at least one voltage regulation module at the output of the at least one inverter, characterised in that it contains an overvoltage protection device as previously presented.

BRIEF DESCRIPTION OF THE DRAWINGS

Other characteristics and advantages will become clear after reading the following description of a preferred embodiment given as a non-limitative example, described with reference to the figures in which.

DETAILED DESCRIPTION

Figure 1:
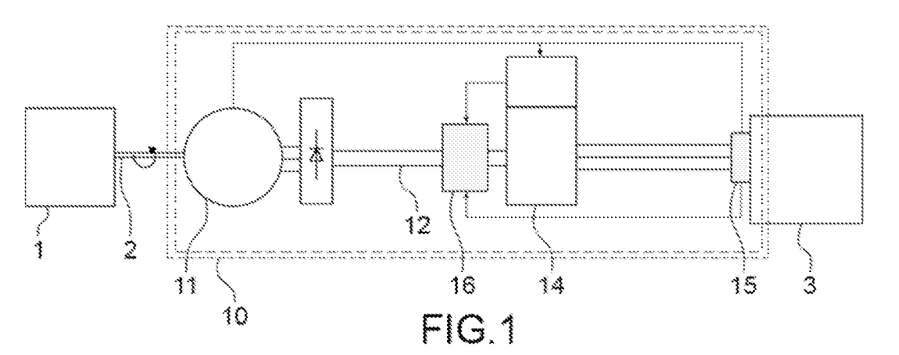
FIG. 1 represents an electrical power supply system equipped with an overvoltage protection device according to one embodiment of the invention.

According to one preferred embodiment shown in FIG. 1, an electrical power supply system 10 comprises a variable speed constant frequency (VSCF) system driven by a primary motor 1 via a shaft 2. The primary motor is typically an aircraft engine.

Starting from its input connected to the shaft 2, the VSCF system 10 comprises a generator 11. It is a DC generator or equivalently an AC generator connected to a rectifier or an AC/DC converter. The first case is considered below. Generator output terminals 11 are connected to a DC link, or a power bus, 12. The DC link 12 is connected to the input terminals of an inverter, or a DC/AC converter 14.

The inverter 14 has a constant frequency three-phase output, for example outputting an AC voltage of 115 V phase-neutral or 230 V phase-neutral. The output from the inverter 14 is a regulation point 15, connected to a power distribution centre 3. The power distribution centre 3 supplies power to aircraft loads; not represented.

According to the invention, the VSCF system comprises an overvoltage protection device, or voltage clipper, 16 connected to the power bus 12, upstream from the inverter 14. The voltage clipper 16 is described in the following. The overvoltage protection device is used to prevent overvoltages at the output from the VSCF system, i.e. at aircraft loads that are powered by the VSCF system.

Note that filters are used in a conventional manner. They were omitted in FIG. 1 to simplify the presentation.

Figure 2A:
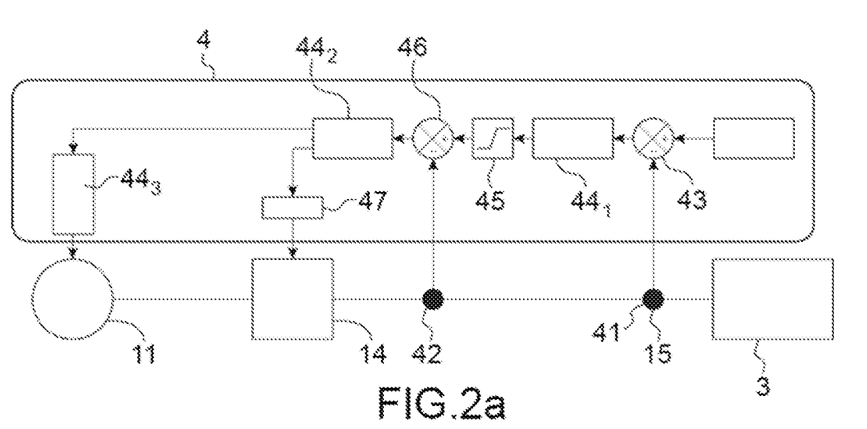
FIG. 2a represents a first embodiment of a voltage regulation module used in the electrical power supply system in FIG. 1.

The VSCF system comprises a regulation module 4 for regulating voltage at regulation point 15, a first embodiment of which is shown in FIG. 2a. Only the generator 11, the inverter 14, and the regulation point 15 of the VSCF system are shown in this figure. Note that the output from the inverter 14 is three-phase, but for simplification reasons, it is shown as if it were single-phase in FIGS. 2a and 2b.

The voltage regulation at the regulation point 15 can be made in two modes.

In the first mode, called "inverter master", voltage regulation at the regulation point 15 is implemented by control of the inverter 14. Control of excitation of the generator 11 is slaved to control of the inverter, which optimises the DC voltage within the VSCF system to minimize system losses and the mass of the output filter.

The regulation module 4 has voltage sensors 41 and current sensors 42 at the regulation point 15, to measure the voltage and current respectively on each phase at the regulation point. Only one voltage sensor and only one current sensor are considered below to simplify the presentation.

The voltage sensor 41 is connected to a first comparator 43 that compares the measured voltage with a setpoint value, for example equal to 115 V.

The output from the first comparator 43 is connected to different regulation stages $44_1$, $44_2$ and $44_3$ in cascade.

A limiter 45 to limit the current setpoint and a second comparator 46 are connected in series between the regulation stages $44_1$ and $44_2$. The current sensor 42 is connected to the second comparator 46 that compares the current setpoint at the output from the limiter 45 and the current measured at the regulation point 15.

The output from the second comparator 46 is connected to the input of the regulation stage $44_2$.

A first output from the regulation stage $44_2$ is connected to a pulse width modulation (PWM) circuit 47, the output of which is connected to the inverter 14. The circuit 47 is capable of issuing control orders to the inverter 14.

A second output from the regulation stage $44_2$ is connected to the regulation stage $44_3$, the output of which is connected to the generator 11. The regulation stage $44_3$ is used to control the excitation current of the generator 11 and thus its output voltage.

Figure 2B:
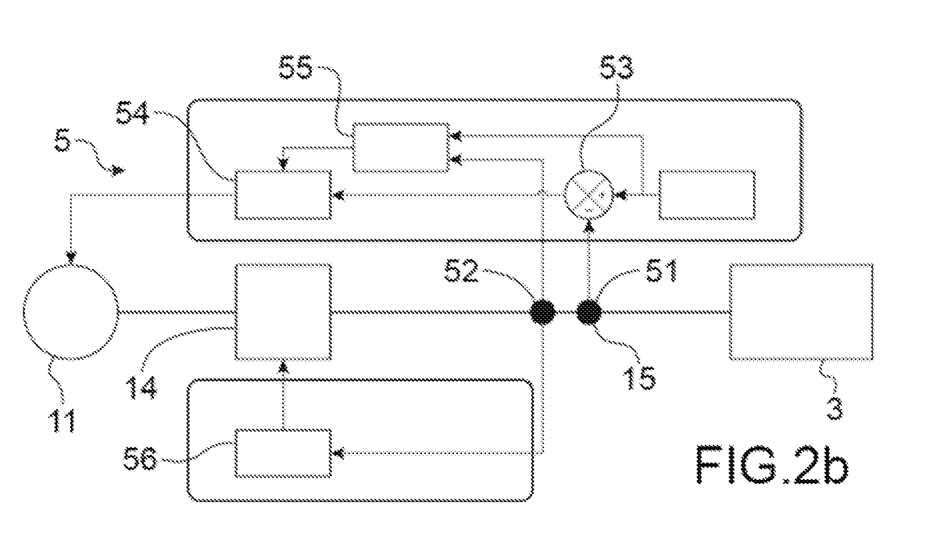
FIG. 2b represents a second embodiment of a voltage regulation module used in the electrical power supply system in FIG. 1.

FIG. 2b shows the second embodiment of regulation module 4 for regulating voltage at the regulation point 15. Only the generator 11, the inverter 14, and the regulation point 15 of the VSCF system are shown in this figure.

The second mode, known as "excitation master", is a voltage regulation at the regulation point 15 by controlling the excitation current of the generator 11. The inverter 14 is configured as follower with a fixed modulation ratio that imposes an output voltage at the regulation point 15 proportional to the voltage at the DC link 12. The regulation is independent of the voltage at the DC link 12.

The regulation module 5 comprises voltage sensors 51 and current sensors 52 at the regulation point 15, to measure the voltage and the current respectively for each phase at the regulation point. As before, only one voltage sensor and only one current sensor are considered below to simplify the presentation.

The voltage sensor 51 is connected to a comparator 53 that compares the measured voltage with a voltage setpoint value, for example equal to 115 V.

The output from the first comparator 53 is connected to a regulation stage in cascade 54.

The current sensor 52 is connected to a limiter 55 that also receives the voltage setpoint value. The output from the limiter 55 is connected to an input of the regulation stage 54.

The output from the regulation stage 54 is connected to the generator 11. The regulation stage 54 is used to control the excitation current of the generator 11 and thus its output voltage.

The current sensor 52 also has an output connected to an input of a limiter 56, the output of which is connected to the inverter 14.

The limiter 56 is able to modify control orders to the inverter 14 to limit the current at the regulation point during a network short circuit.

Figure 3:
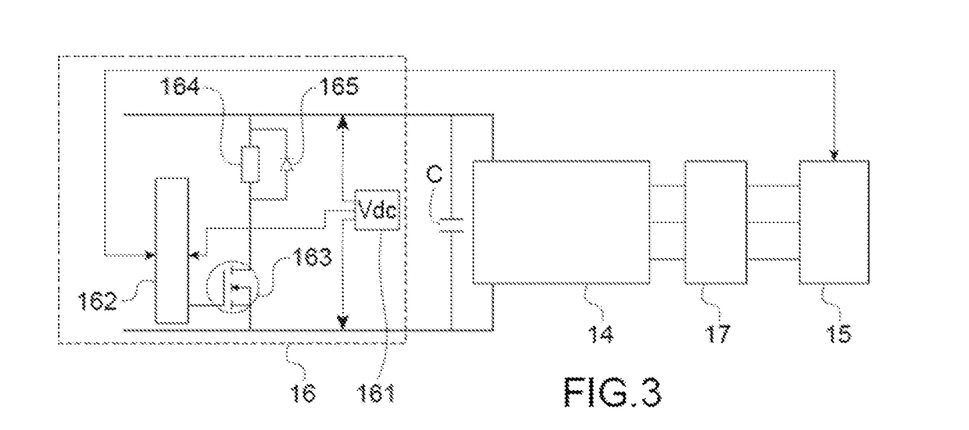
FIG. 3 represents the overvoltage protection device according to a first embodiment of the invention.

FIG. 3 specifically represents a first embodiment of the voltage clipper 16. The clipper 16 is integrated into the VSCF system or alternatively it is arranged in separate equipment and is connected to the VSCF system.

The clipper 16 is connected between the input terminals of the inverter 14. It therefore acts on the voltage of the DC link 12, upstream from the inverter 14. The clipper 16 has a voltage $V_{dc}$ sensor 161 to measure the voltage at the input terminals of the inverter 14. The sensor 161 is connected to a circuit 162 that controls the clipper 16 to provide it with the measured voltage $V_{dc}$. The control circuit 162 is connected to a switch 163. For example, the switch 163 is a bipolar transistor, and particularly an isolated gate bipolar transistor (IGBT), or a field effect transistor, and particularly a MOSFET. The clipper 16 may comprise several switches. The case of a field effect transistor is considered in the following. The control circuit 162 is then connected to the gate of the field effect transistor 163.

Alternatively, the control circuit 162 is also connected to a voltage sensor at the regulation point (not shown), to the generator control circuit and to the inverter control circuit.

The source of the field effect transistor 163 is connected to an input terminal of the inverter 14 and its drain is connected in series with a resistor 164, that is itself connected in parallel with a diode 165. The resistor 164 and the diode 165 are also connected to the other input terminal of the inverter 14. The resistor 164 is used to dissipate energy when the switch 163 is closed.

Note that a capacitor C is connected between the input terminals of the inverter 14 and the output of the inverter is connected to the regulation point 15 through a filter 17 known in itself.

The clipper switch can be controlled in different regulation modes, for example of the PI type or the hysteresis type. The following describes the example of a hysteresis control.

The clipper then operates as follows. The sensor 161 measures the voltage $V_{dc}$. The control circuit 162 compares the measured voltage $V_{dc}$ with a threshold that depends on a voltage level below a maximum voltage limit at the regulation point 15. As long as the voltage $V_{dc}$ remains below the threshold, the switch 163 is open and the clipper 16 is inactive.

If the voltage $V_{dc}$ exceeds the threshold, the clipper 16 is activated. The control circuit 162 controls closing of the switch 163 so as to lower the voltage $V_{dc}$.

Operation of the clipper is independent of the voltage regulation at the regulation point, regardless of whether it is a regulation of the excitation of the generator or by control of the inverter. In fact, a regulation of the generator excitation is independent of the DC voltage within the VSCF system and therefore of the action of the clipper, because the threshold used by the clipper is higher than the voltage setpoint at the regulation point 15, to the gain of the inverter near. Thus, even if the clipper is activated, the voltage regulation at the regulation point is not affected. In the case of a regulation performed by control of the inverter, activation of the clipper limits constraints on the generator and on the inverter by limiting the voltage, and protects the system in the case of a failure of the inverter control.

In the event of a malfunction or if the voltage is too high, the control circuit 162 can also control opening of the line contactor, not shown, located at the regulation point and cut off the generator excitation.

Alternatively, the voltage sensor at the regulation point measures the voltage at the regulation point and supplies the measured value to the control circuit 162. The measured voltage value at the regulation point may indicate an overvoltage. The control circuit 162 can then control opening of the line contactor and control opening of all inverter switches to stop the control of the inverter.

According to another variant, the clipper can also act to cut off the machine excitation and to control opening of the line contactor in order to protect the aircraft electricity network in the event of a fault.

Figure 4:
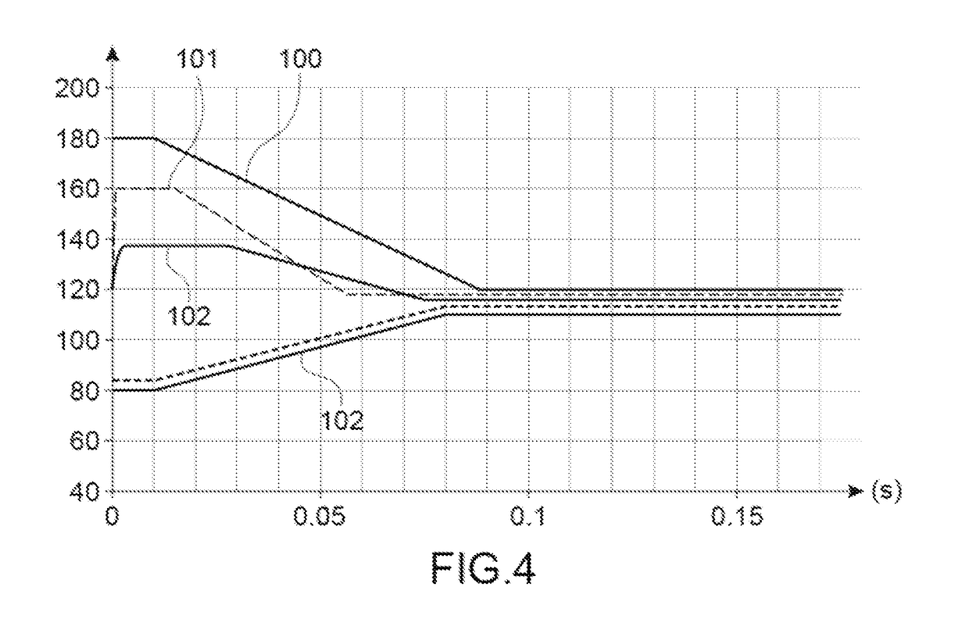
FIG. 4 represents the RMS voltages at the regulation point, with and without the overvoltage protection device according to the invention.

FIG. 4 represents the RMS voltages at the regulation point, with and without the clipper according to the invention, Specifically, the curves 100 represent the RMS voltages that must not be exceeded by the voltage generation system during short circuit load shedding or clarification transients.

Curve 101 represents the voltage for a VSCF generation system with an "excitation master" type control.

The amplitude of the overvoltage is directly related to the design of the generator (main stator) making it necessary to limit the inductance of the machine to limit the overvoltage.

The duration of the plateau of the curve 101 is linked to the design of the main rotor and in particular to the energy stored in this circuit (½ LI$^2$) and to the discharge time constant of this circuit through its internal resistance and rotating diodes. In order to reduce this time, the L/R time constant has to be reduced, which has a direct impact on losses of the machine and its mass. Reducing the inductance L will require an increase in the main rotor current to generate an equivalent induction and may lead to limitations related to saturation of the magnetic circuit and an increase in losses in the rotor in I$^2$. Increasing the resistance R will also increase losses and lead to a greater temperature rise. This transient imposes severe constraints on the design of the generator and in particular on the design of the main rotor.

The voltage decay slope (curve 101) is managed mainly by the generator excitation control circuit, but the response time of the excitation circuit can also slow the response time of the system.

Curve 102 represents the voltage for the VSCF system equipped with the clipper according to the invention.

The voltage at the regulation point can be limited by the clipper.

In addition, the clipper according to the invention makes it possible to limit constraints on the design of the generator, to limit constraints on the semiconductors of the inverters (voltage withstand of components and switching losses) and also to limit constraints on the excitation circuit by increasing its response time.

Nominal operation of the clipper will now be described in detail. There are two cases to consider when defining the maximum gain of the inverter between the DC input voltage and the inverter output voltage.

The first case is simple modulation, without harmonic 3 or vector control. Operation of the clipper will now be described for this case.

The inverter transfer function during nominal control is as follows:

$$V_{dc} \to \frac{r}{2 \cdot \sqrt{2}} \to V_{por}$$

where r is the modulation depth of the inverter, r<1, and $V_{por}$ is the voltage at the regulation point 15.

In this control case, by limiting the voltage $V_{dc}$ of the bus 12 to 384 V, the voltage at the regulation point 15 is limited to 135.8 Vrms.

The clipper acts as a buffer between regulation of the generator excitation and the network voltage. Activating the clipper gives the system additional time to confirm a possible fault. When the clipper is activated:

Either the excitation regulation succeeds in reducing the DC bus voltage and the clipper reopens, Or the clipper remains closed for more than 40 ms and orders are given to open the line contactor and to stop operation of the inverter in the case of "inverter master" mode, in which excitation of the generator is slaved to control of the inverter; in the case of "excitation master" mode, an order is also given to stop excitation of the generator.

The second case is a voltage control at the regulation point 15 using harmonic 3. Operation of the clipper will now be described for this case.

In the case of control based on harmonic 3, the inverter transfer function becomes:

$$V_{dc} \to \frac{r}{\sqrt{6}} \to V_{por}$$

Thus, by limiting the voltage $V_{dc}$ to 332 V, the voltage at the regulation point 15 is limited to 135.5 Vrms.

In the case of control based on harmonic 3, the clipper can still be used to limit voltage transients. This configuration has the advantage of limiting the voltage $V_{dc}$ to a lower value and therefore decreasing the impact on the inverter 14 in terms of voltage withstand and losses.

The clipper 16 according to the invention can be used to detect a regulation fault of the inverter 14.

In this case, the clipper 16 is activated and then limits the voltage $V_{dc}$. It provides a delay of 10 to 15 ms to request opening of the line contactor, to stop the inverter and the generator excitation.

This will thus keep the voltage at the regulation point below a predetermined value.

Figure 5:
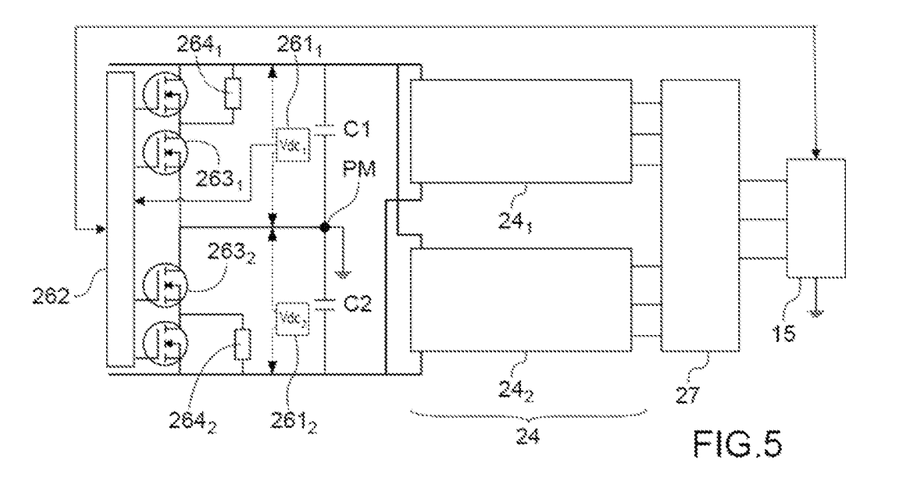
FIG. 5 represents the overvoltage protection device according to a second embodiment of the invention.

FIG. 5 shows a second embodiment of a voltage clipper adapted to the case of an inverter 24 equipped with a capacitive mid-point PM connected to the aircraft neutral.

The inverter 24 has one or two inverter modules, in the example shown two inverter modules 24$_1$ and 24$_2$ each connected to the input terminals of the inverter. The midpoint PM is connected to the input terminals of the inverter via two capacitors C1 and C2 respectively.

The clipper 26 is connected between the input terminals of the inverter 24. The clipper 26 has a voltage sensor 261$_1$ to measure the voltage $V_{dc1}$ between a first input terminal, for example the positive terminal, of the inverter 24, and the capacitive mid-point PM, in other words the neutral of the aircraft. Similarly, the clipper 26 comprises a voltage sensor 261$_2$ to measure the voltage $V_{dc2}$ between the other input terminal, for example the negative terminal, of the inverter 24, and the capacitive mid-point PM.

Sensors 261$_1$ and 261$_2$ are connected to a circuit 262 that controls the clipper 26 to provide the measured voltages $V_{dc1}$ and $V_{dc2}$ to it. The control circuit 262 is connected to switches 263$_1$ and 263$_2$ between the first input terminal of the inverter 24 and the capacitive mid-point PM; and between the second terminal of the switch and the capacitive mid-point PM, respectively. For example, the switches comprise transistor, in this example there are four transistors.

Each of the switches 263$_1$ and 263$_2$ is connected to a corresponding energy dissipation resistor 264$_1$ and 264$_2$, respectively. Furthermore, each of the resistors 264₁ and 264₂ is connected to a corresponding input terminal of the inverter 24.

The clipper 26 is a sort of double clipper comprising two similar clipping modules, one between the first input terminal of the inverter 24 and the capacitive mid-point PM and the other between the second input terminal of the inverter 24 and the capacitive mid-point PM.

Note that output of the inverter 24 is connected to the regulation point 15 through a filter 27 known in itself.

Operation of the clipper 26 is described in the following.

FIGS. 6a to 6e show examples of short circuit time diagrams for a semiconductor of the inverter equipped with a capacitive mid-point as shown in the previous figure.

The clipper 26 improves protection of the aircraft electricity network against the appearance of a DC voltage at the inverter output.

In the event of a short circuit of a semiconductor of the inverter, the voltage present at the terminals of the capacitive half-bridge will be applied to the output voltage at the regulation point. Classical actions to protect the electricity network are to cut off excitation of the machine and to open a contactor at the inverter output. These protections have a response time of more than 10 ms, while the DC component of the output voltage must be less than 6V in less than 5 ms.

In the case of an inverter like that shown in FIG. 3, a semiconductor fault can be detected in less than 10 μs (desaturation protection), the clipper switch can be activated quickly and thus the capacitor can be discharged through the resistor in less than 2 ms:

$$V = U_S \cdot e^{-t/\tau}$$

in which:

V is the DC voltage at the end of the capacitor discharge,
U₀ is the initial voltage at the capacitor terminals,
t is the discharge time,
τ is the RC time constant, in which R is the resistance of the clipper and C the capacitance of the capacitor at the inverter input terminals.

In the case of an inverter equipped with a capacitive mid-point, like that shown in FIG. 5, use of the clipper 26 also means that the generator does not have to be short circuited during the time necessary to cut off excitation to the generator rotor, and this limits the short circuit current seen by the generator.

Figure 6A:
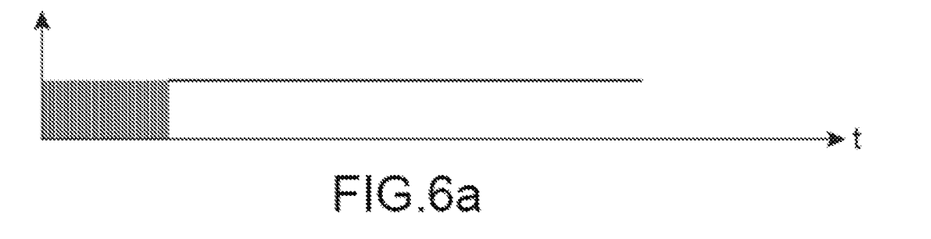
FIG. 6a, FIG. 6b, FIG. 6c, FIG. 6d and FIG. 6e represent time diagrams in the event of a short circuit of a semiconductor of the inverter shown in FIG. 5.
Figure 6B:
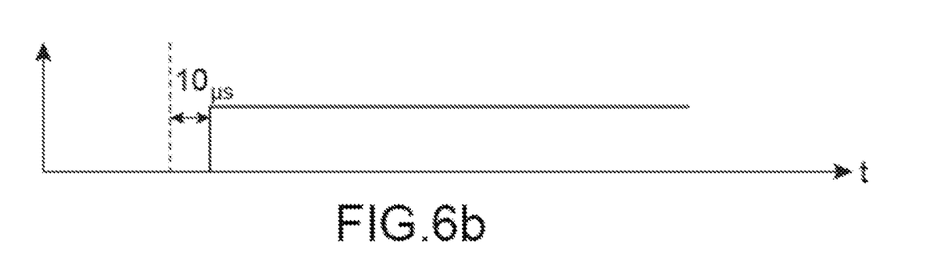
Figure 6C:
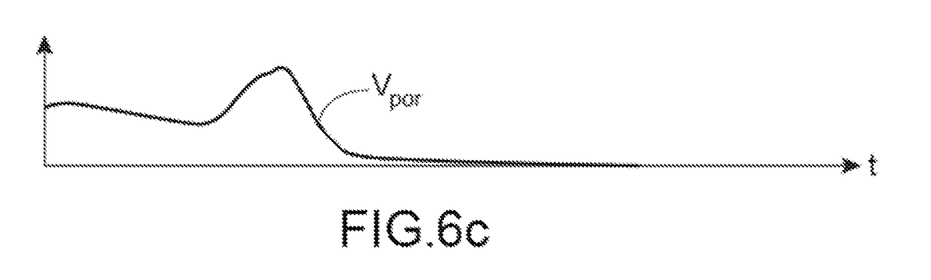
Figure 6D:
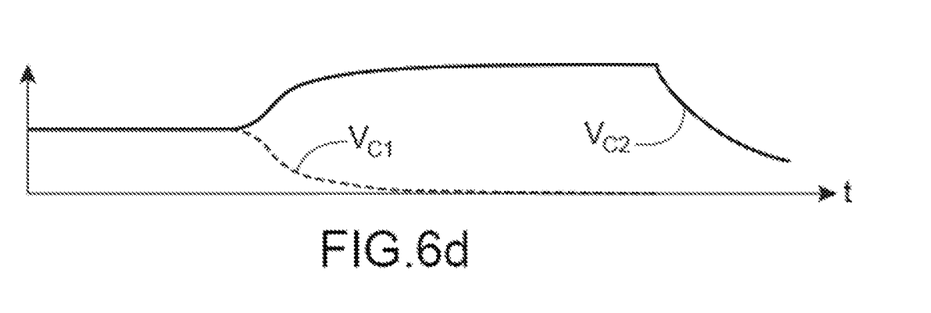
Figure 6E:
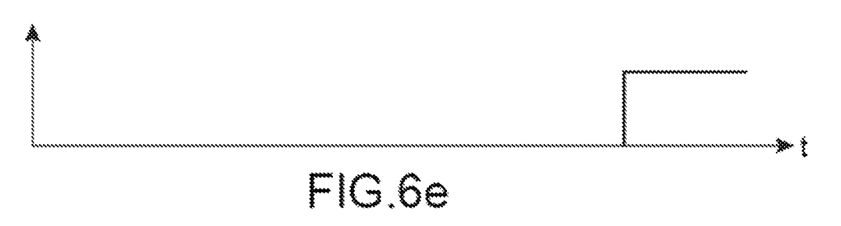

FIG. 6a shows the appearance of a short circuit on an inverter semiconductor, in this case an inverter semiconductor connected to the first input terminal of the inverter 24. FIG. 6b shows control over the first clipping module. FIG. 6c shows the voltage $V_{por}$ at the regulation point 15. FIG. 6d shows the voltage $V_{C1}$ at the terminals of the capacitor C1 and the voltage $V_{C2}$ at the terminals of the capacitor C2. FIG. 6e shows control over the second clipping module.

Figure 7:
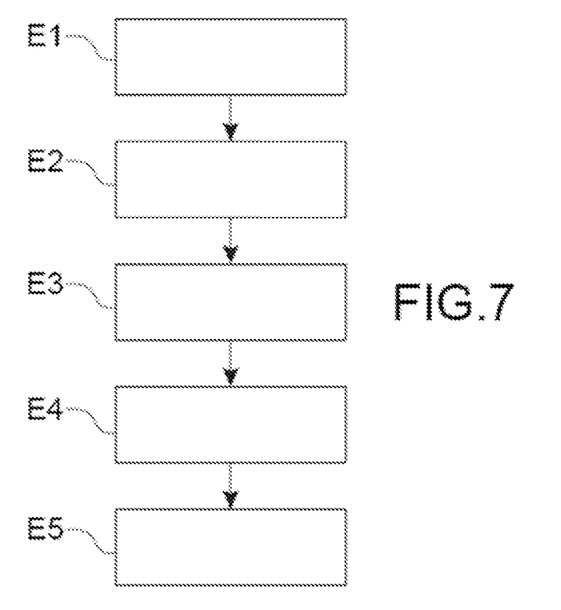
FIG. 7 represents operation of the overvoltage protection device in the event of a short-circuit of a semiconductor of the inverter shown in FIG. 5, according to one embodiment of the invention.

[FIG. 7] represents operation of the overvoltage protection device in the case of a short circuit of a semiconductor of the inverter equipped with a capacitive mid-point as shown in FIG. 5, in the form of a flow chart comprising steps E1 to E5.

When a short circuit is detected on an inverter semiconductor connected to the first input terminal of the inverter 24 in step E1 (FIG. 6a), this step is followed by step E2 in which the first clipping module is controlled (FIG. 6b) after 10 μs with a duty factor of 1. This means that the capacitor C1 can be discharged via resistor 264₁ in less than 2 ms, thus protecting loads connected to the aircraft electricity network. During this time, inverter protections will have disabled the controls of all semiconductors (or switches) in order to prevent circulation of the fault current.

Thus, discharging the capacitor C1 through resistor 264₁ guarantees that there is no DC component on the network (FIG. 6c) in less than 5 ms without short circuiting the generator, since the second clipping module has remained open. The only consequence of this is that the capacitor C2 will be charged to the DC bus voltage (FIG. 6d).

The next step E3 is to stop control over the two inverter modules.

The next step E4 is the order to open the line contactor opening and cutoff of the generator excitation current.

After the line contactor is open and the generator excitation current has been cut off, step E4 is followed by step E5 in which a delay, for example 100 ms, is initiated. The generator is no longer excited at the end of this time-out. The second clipping module (FIG. 6e) is then ordered to discharge the capacitor C2 through resistor 264₂.

The device is then in the safe position and has prevented the appearance of a DC voltage at the inverter output in less than 2 ms.

In the case of a short circuit on an inverter semiconductor connected to the second terminal of the inverter 24, operation is similar by reversing control over the first and second clipping modules.

Figure 8:
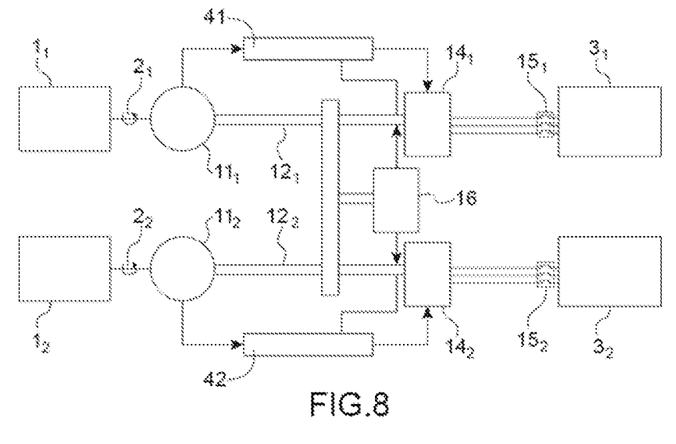
FIG. 8 represents the overvoltage protection device according to a third embodiment of the invention.

FIG. 8 represents a voltage clipper according to a third embodiment of the invention.

In this embodiment, the VSCF system is adapted to be driven by two primary motors 1₁ and 1₂ via shafts 2₁ and 2₂ respectively.

Starting from its inputs connected to shafts 2₁ and 2₂, the VSCF system comprises two generators 11₁ and 11₂ respectively. It should be noted that as a variant, several generators can be driven by the same motor. Output terminals of generators 11₁ and 11₂ are connected to two DC links, or power buses, 12₁ and 12₂ respectively. DC links 12₁ and 12₂ are connected to the input terminals of two inverters, or DC/AC converters, 14₁ and 14₂ respectively.

The inverters 14₁ et 14₂ have constant frequency three-phase outputs, for example outputting an AC voltage of 115 V phase-neutral or 230 V phase-neutral. The outputs of inverters 14₁ and 14₂ are regulation points 15₁ and 15₂, connected to power distribution centres 3₁ and 3₂. The power distribution centres 3₁ and 3₂ supply power to aircraft loads, not represented.

The VSCF system also comprises two voltage regulation modules 4₁ and 4₂ for regulating voltage at regulation points 15₁ and 15₂.

According to the invention, the VSCF system comprises an overvoltage protection device, or voltage clipper, 16 connected to power buses 12₁ and 12₂, upstream from the inverters 14₁ and 14₂. The voltage clipper 16 is similar to that previously described.

What is claimed is:

1. Variable speed constant frequency electrical energy generation system comprising at least one DC generator connected by a DC bus to the input terminals of at least one inverter (24) and at least one regulation module for regulating output voltage of the at least one inverter, the inverter comprising one or two inverter modules each connected to the input terminals of the inverter, a capacitive mid-point connected to the aircraft neutral being connected to the input terminals of the inverter via two corresponding capacitors (C1, C2), the system further comprises an overvoltage protection device comprising a circuit (16) comprising at least one switch (263₁, 263₂) in series with a resistor (264₁, 264₂), the circuit being connected between the input terminals of the at least one inverter, a first voltage sensor (261₁) to measure the voltage (Vdc1) between a first input terminal of the inverter (24) and the capacitive mid-point, a second voltage sensor (261₂) to measure the voltage (Vdc2) between a second input terminal of the inverter 24 and the capacitive mid-point and two switches (263₁, 263₂) between the first terminal of the inverter (24) and the capacitive mid-point and between the second terminal of the inverter and the capacitive mid-point, respectively, a control circuit (262) connected to the first and second measurement sensors and capable of receiving a voltage measured by the first and second measurement sensors respectively, comparing the measured voltage with a threshold and controlling closure of at least one switch if the measured voltage is greater than the threshold and otherwise opening of the at least one switch.

2. Variable speed constant frequency electrical energy generation system according to claim 1, wherein the at least one regulation module for regulating the output voltage of the at least one inverter is adapted to control the at least one inverter.

3. Variable speed constant frequency electrical energy generation system according to claim 1, wherein the at least one regulation module for regulating the output voltage of the at least one inverter is adapted to control the excitation current of the at least one generator.

4. Variable speed constant frequency electrical energy generation system according to claim 1, wherein the control circuit is capable of receiving a voltage value measured at the output from the at least one inverter by at least one voltage sensor, and is capable of controlling opening of a line contactor located at the output from the at least one inverter.

5. Variable speed constant frequency electrical energy generation system according to claim 1, wherein the control circuit is capable of ordering that operation of the at least one inverter is stopped.

6. Variable speed constant frequency electrical energy generation system according to claim 5, wherein the control circuit is capable of ordering that excitation of the at least one generator is stopped.

7. Method of protection against overvoltages of a variable speed constant frequency electrical energy generation system according to claim 1, the method comprising:
- detecting a short circuit on an inverter semiconductor connected to one of the input terminals of the inverter,
- ordering closing of the switch corresponding to said one of the inverter input terminals,
- stopping control of the inverter,
- ordering opening of the line contactor and cut off the generator excitation current, and
- ordering closing of the switch corresponding to the other of the inverter input terminals after a timeout.

* * * * *